United States Patent [19]

Swift et al.

[11] Patent Number: 4,544,190
[45] Date of Patent: Oct. 1, 1985

[54] CONNECTION NUT SEAL

[75] Inventors: Allan W. Swift, Denville; Sarah B. S. Rivara, Blairstown, both of N.J.

[73] Assignee: E. J. Brooks Company, Newark, N.J.

[21] Appl. No.: 523,098

[22] Filed: Aug. 15, 1983

[51] Int. Cl.⁴ .................. B65D 27/30; B65D 33/34; B65D 55/06
[52] U.S. Cl. .................................. 292/307 B; 292/19
[58] Field of Search ................ 292/307 B, 19, 80, 87

[56] References Cited

U.S. PATENT DOCUMENTS

| | | | |
|---|---|---|---|
| 2,430,985 | 11/1947 | King | 292/19 X |
| 3,971,237 | 7/1976 | Rasmussen | 292/87 X |
| 4,326,740 | 4/1982 | Guiler | 292/307 B |
| 4,372,593 | 2/1983 | Kesselman | 292/307 B |
| 4,378,948 | 4/1983 | Chrones | 292/19 |

Primary Examiner—Gary L. Smith
Assistant Examiner—Russell W. Illich
Attorney, Agent, or Firm—Robert E. Ross

[57] ABSTRACT

A seal for a pipe coupling such as is used to connect a gas meter to a gas supply line. The seal is made in two portions having integral fastening means for locking the two portions around the nut of a coupling. The fastening means include a pair of flexible legs on one portion of the seal to be engaged with a tongue on the other portion of the seal. The tongue is provided with an aperture which provides a vertical latch surface and two horizontal latch surfaces extending outwardly from the ends of the vertical latch surface.

9 Claims, 10 Drawing Figures

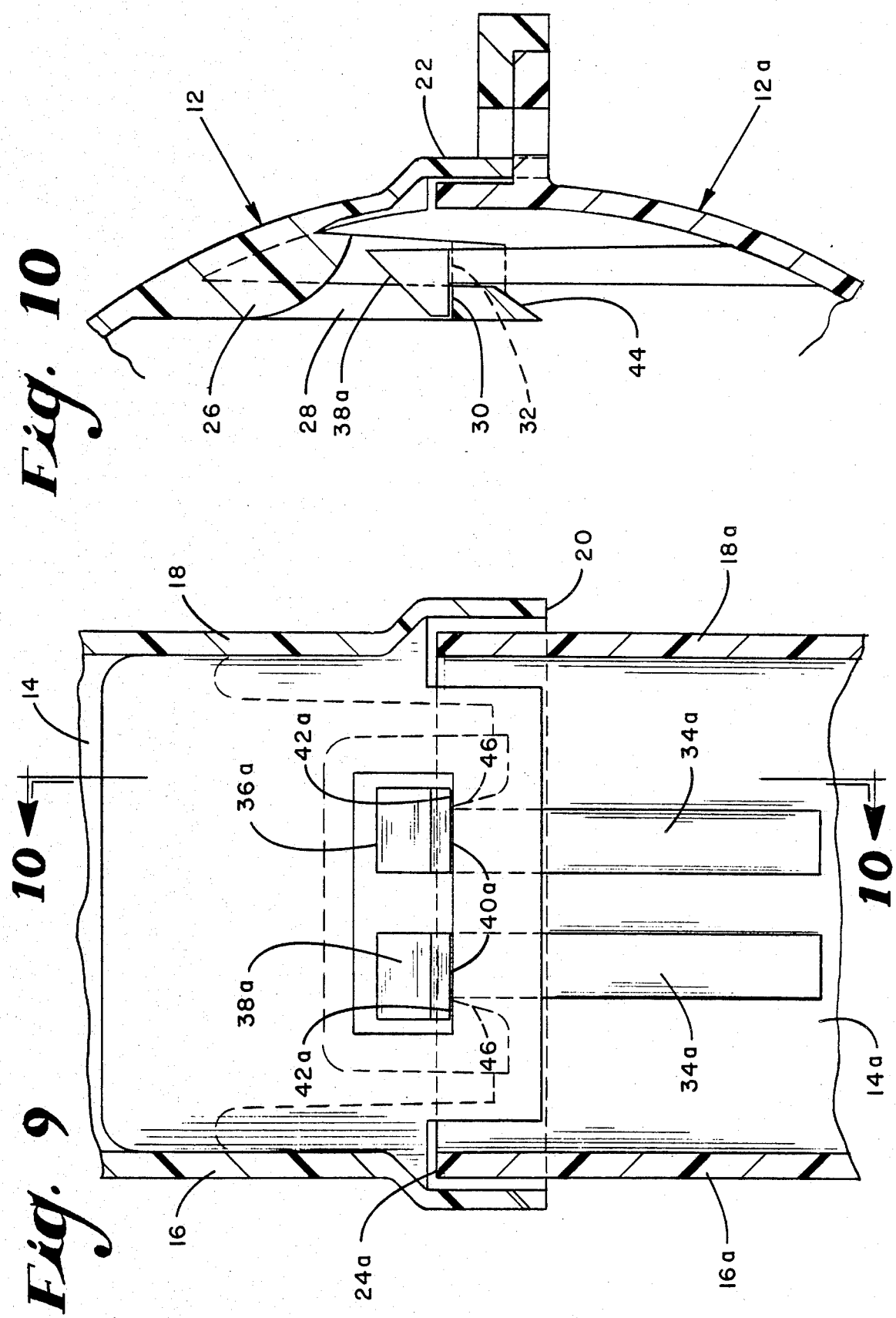

CONNECTION NUT SEAL

BACKGROUND OF THE INVENTION

In the gas utility industry, it is often required that provision be made to detect attempts to tamper with gas meters, said attempts being either for the purpose of removing a meter connection nut to remove a gas blocking plate, or to enable the use of gas directly from the supply line without passing through the meter. For this purpose it has been common to enclose the nut which couples the meter pipe to the supply pipe with a seal in the form of two halves which are fastened together with a lead and wire seal, or are provided with integral means for snapping together into nonremovable engagement. Such a seal is shown in U.S. Pat. No. 4,326,740 and in U.S. Pat. No. 4,372,593.

However it has been found that given sufficient time, an unauthorized person can pick the fastening means in such seals so that the seal can be removed and replaced without leaving evidence of tampering.

SUMMARY OF THE INVENTION

A seal for a gas meter connection nut is formed of molded plastic of a type which is relatively brittle, with the seal comprising a ring-shaped member which is generally U-shaped in cross-section so as to enable it to enclose a connection nut. The shell is formed in two portions which preferably are identical and separate halves which may be snapped together by means to be described, into locking non-removable engagement.

In a preferred embodiment of the invention, the fastening means comprises, in each half, a pair of flexible legs at one end and a tongue at the other end. The tongue is provided with an aperture which provides a vertical latch surface and two spaced horizontal latch surfaces at the ends of the vertical latch surface.

Each of said pair of legs has a latch shoulder on the end which provides a horizontal latch surface and a vertical latch surface, so that on assembly with the tongue, one latch surface of the leg engages the horizontal latch surface of the tongue aperture and the other latch surface of the leg engages a vertical latch surface of the tongue aperture.

Therefore to disengage the ends of the seal, each leg must be disengaged from both latch surfaces, and both legs must be disengaged simultaneously, which has been found to be impossible to accomplish in any time that is likely to be available to an interloper.

BRIEF DESCRIPTION OF THE FIGURES OF THE DRAWING

FIG. 9 is a view similar to FIG. 7, in which the legs have been snapped into engagement in the aperture.

FIG. 10 is a view in section taken on line 10—10 of FIG. 9.

DESCRIPTION OF THE ILLUSTRATED EMBODOMENT

Figure 1:
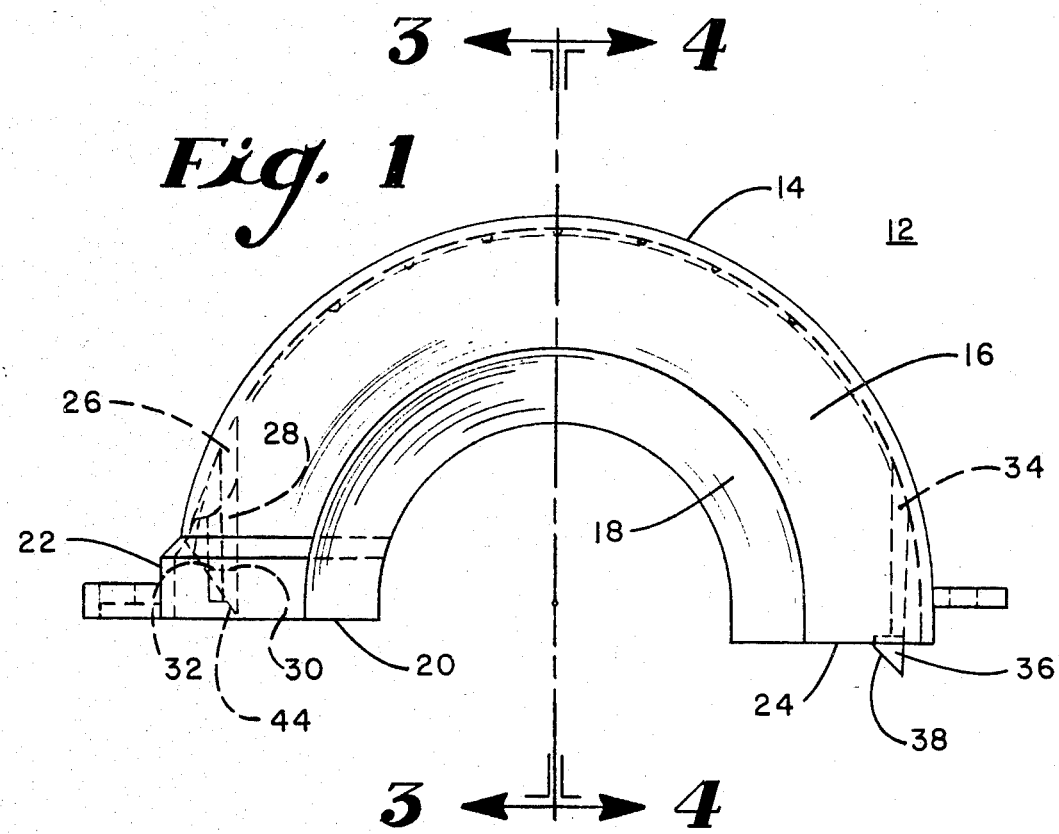
FIG. 1 is a top plan view of connection nut seal portion embodying the features of the invention.
Figure 2:
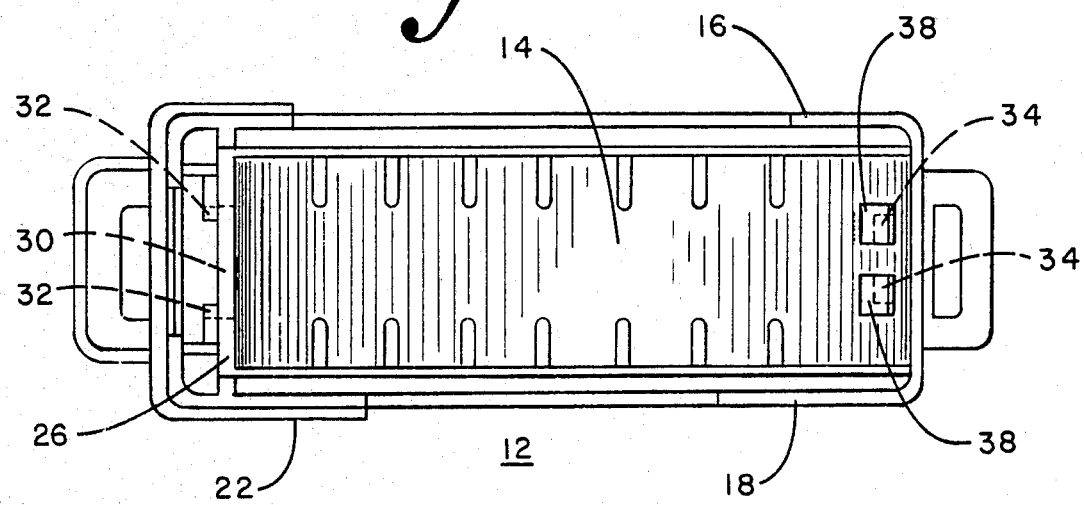
FIG. 2 is a view of the seal portion of FIG. 1 as seen from the bottom.
Figure 3:
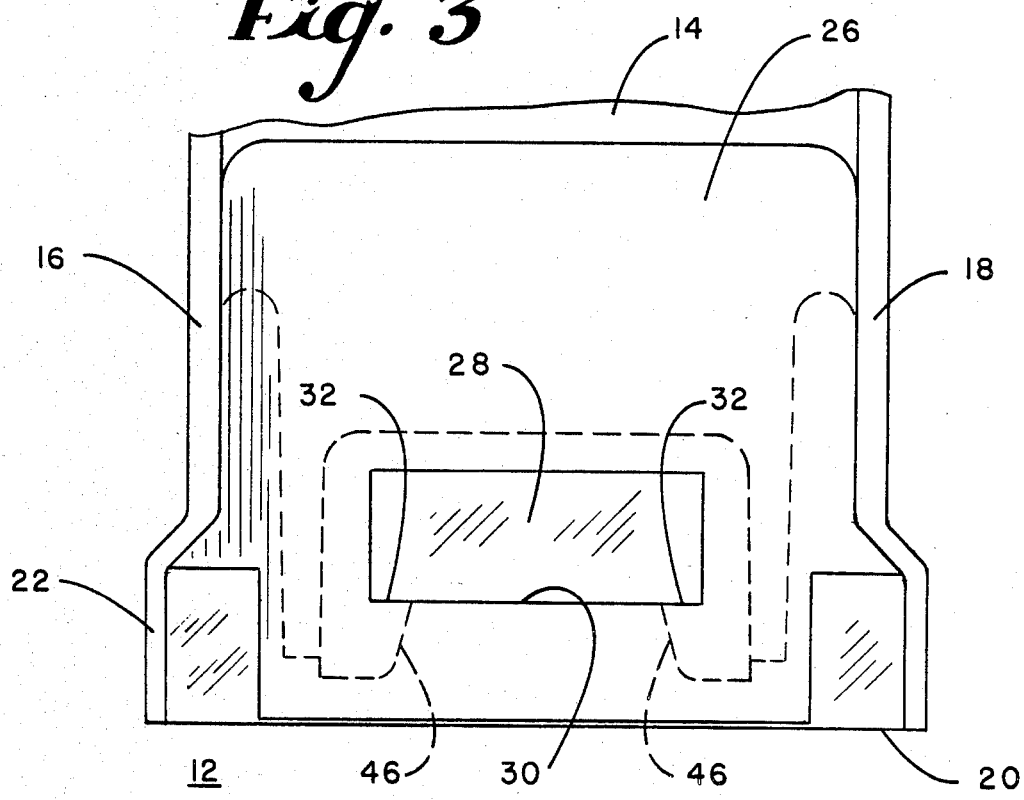
FIG. 3 is a view in section taken on line 3—3 of FIG. 1.
Figure 4:
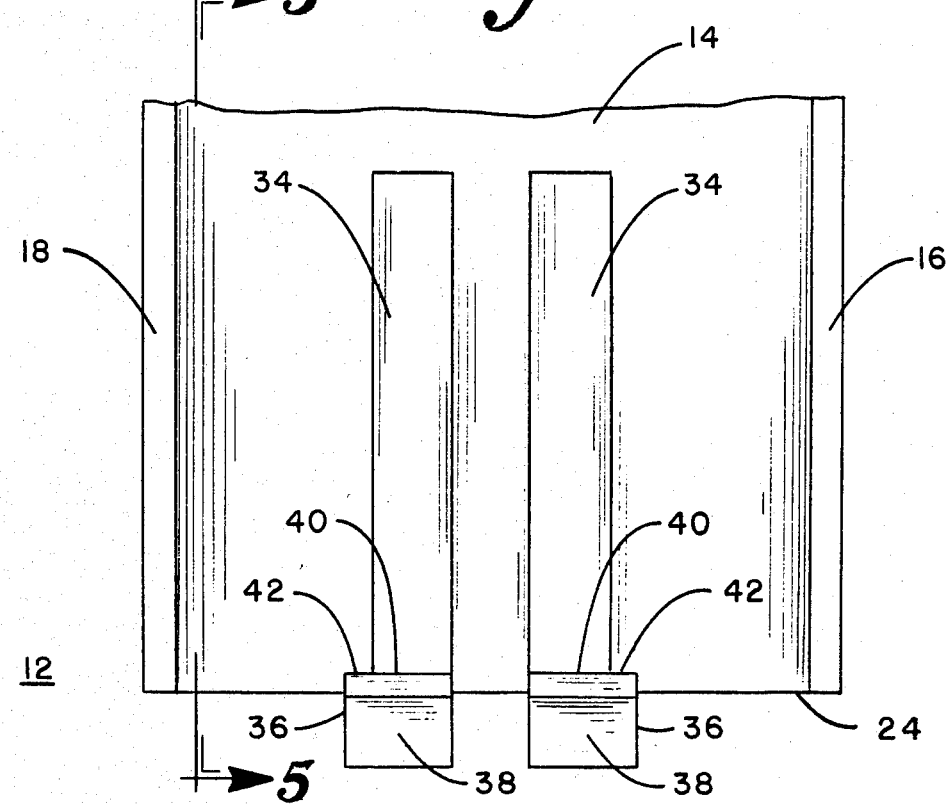
FIG. 4 is a view in section taken on line 4—4 of FIG. 1.
Figure 5:
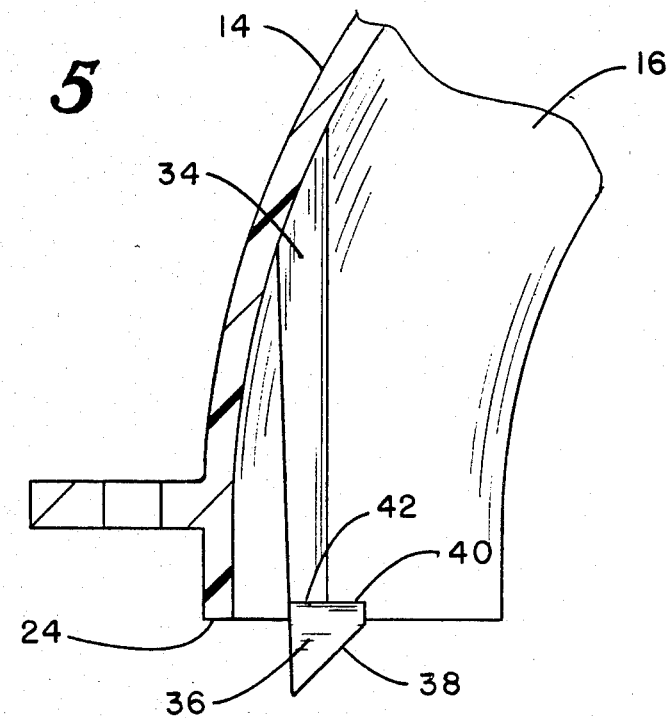
FIG. 5 is a view in section taken on line 5—5 of FIG. 4.
Figure 6:
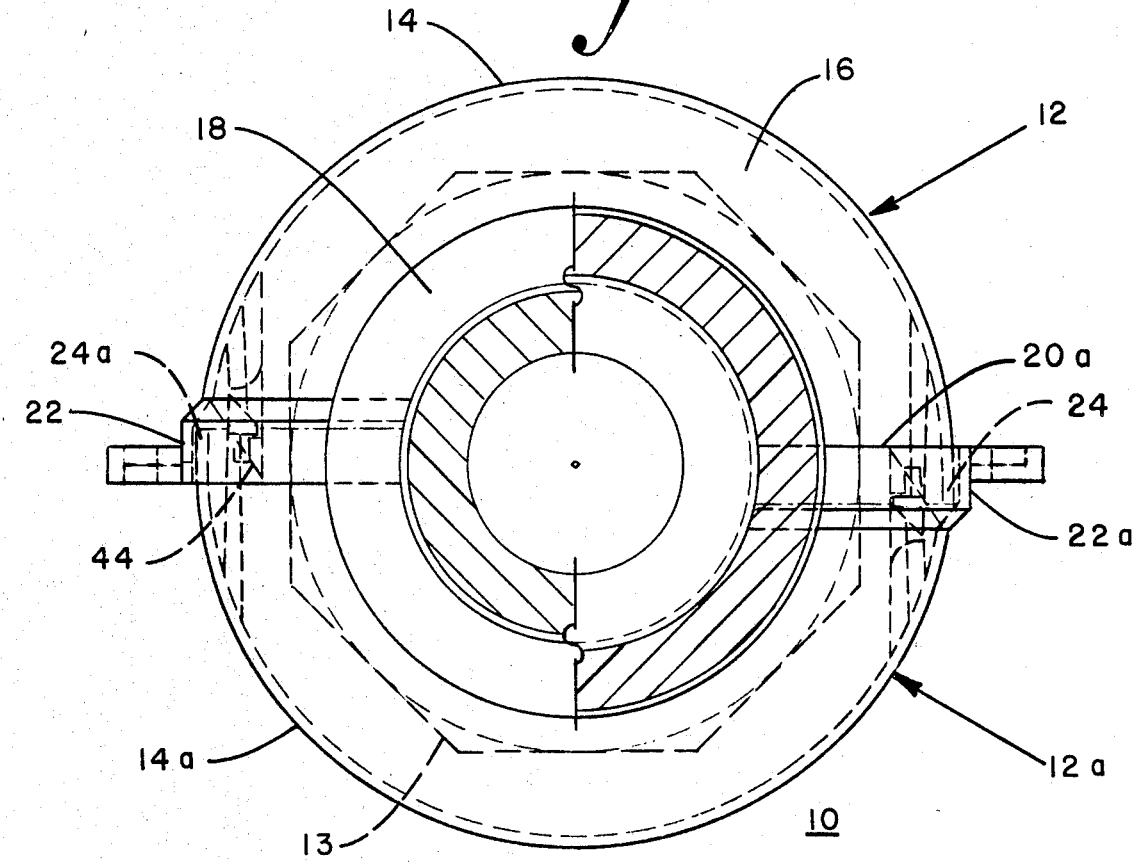
FIG. 6 is a top plan view of a connection nut seal embodying the features of the invention assembled onto a gas meter connection nut.

Referring to the drawing, there is illustrated a connection nut seal 10 which is formed of two identical housing portions 12 and 12a which are formed of a plastic material which is relatively brittle yet has some limited resilience, such as polystyrene.

The housing portions are intended for use in pairs to enclose a conection nut 13 of a gas meter or the like, and the individual portions are generally semi-circular in plan shape and are U-shaped in cross-section, providing an outer peripheral wall 14 and upper and lower flanges 16 and 18 which extend radially inwardly from the wall.

To assist in preventing access to the fasteners (to be described) one end 20 is provided with an enlarged portion 22 which is dimensioned to enclose the end 24a of the identical housing portion 12a when the two portions are assembled.

The above described portions of the seal are similar to that shown and described in a co-pending application Ser. No. 443,236 filed Nov. 22, 1982, and assigned to the same assignee as the present application.

The present applicatiaon provides an improved fastening means now to be described.

The end 20 of the housing is provided with a tongue 26 which is attached to the interior surface of the housing wall 14 and extends forwardly therefrom to terminate substantially at the foremost edge of the enlarged portion 22, and is provided with an aperture 28 which provides a first latching edge 30 extending transversely across the tongue and therefore perpendicular to the plane of the assembled housing portions, and a pair of second latching edges 32 at the opposite ends of the first latch surface, said second latch surfaces extending perpendiculer to the first latch surface.

The other end 24 of the housing portion is provided with a pair of resilient legs 34 which are attached to the interior surface of the housing wall 14 and project forwardly therefrom to terminate just forwardly of said end. Each leg 34 is flexible toward and away from the adjacent housing wall, and also toward and away from each other, and is provided with a latching member 36 on the extreme end which is shaped to provide a cam surface 38 leading to a first latching surface 40. The latching member is wider than the adjacent portion of the leg 34 to which it is attached, providing a second latching surface 42. Both latching surfaces are generally perpendicular to the axis of the leg.

To facilitate engagement of the legs with the tongue aperture of another housing portion, the tongue 26 may be provided with a cam surface 44 on the side of the tongue adjacent the housing wall, which extends from the extreme end thereof to the aperture 28, and a pair of second cam surfaces 46 at opposite ends of the cam surface 44, said cam surfaces 46 being inclined inwardly toward each other.

The components are so positioned and dimensioned that when the end portion 24a of another housing portion 12a is inserted into the end 20 of the housing portion 12, the legs 34 ride over the first cam surface 44 by flexing toward the adjacent wall portion, and also ride over the second cam surfaces 46 by flexing together. On reaching the latching surfaces 30 and 32 of the aperture 28, the legs snap over the aperture edge so that the latching surfaces 40 and 42 of the legs engage the latching surfaces 30 and 32, respectively, of the aperture.

At the opposite ends of the housing, legs 24 are simultaneously engaging in aperture 28a in the same manner.

Figure 7:
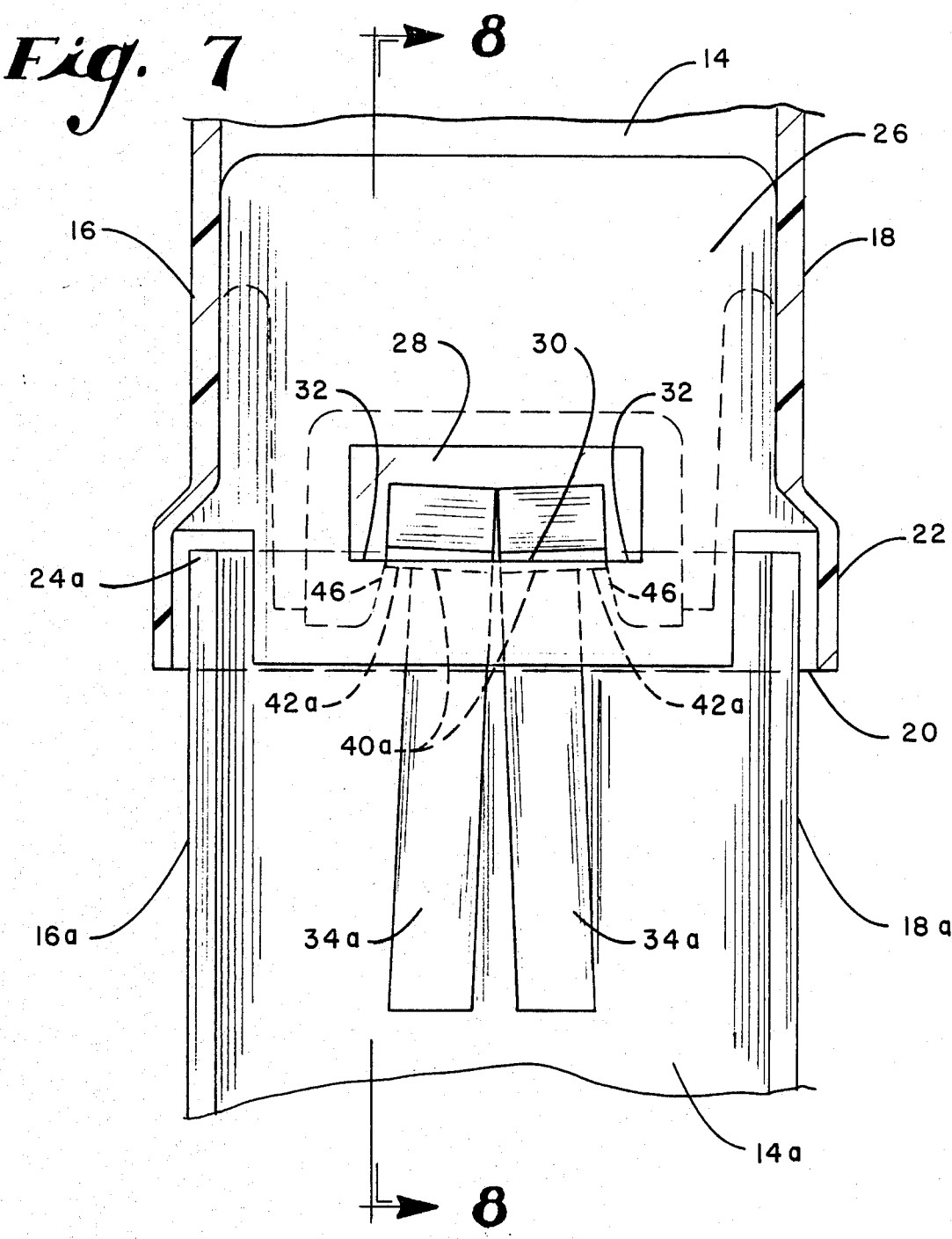
FIG. 7 is a view, partly in section, of the resilient legs of one seal portion entering into engagement with the aperture of another seal portion.

In a preferred emmbodiment of the invention, the legs 34 are so spaced and dimensioned in relation to the width of the aperture 28 between the latching edges 32 that as the legs enter the aperture and are cammed together by the camming surfaces 46, (See FIG. 7) the ends of the legs come in contact with each other just before the latching surfaces 40 and 42 of the legs snap through the aperture into engagement with the latching edges of the aperture. Therefore completion of the assembly of the legs requires that there be some resilient flexing of some portion of the assembly.

Figure 8:
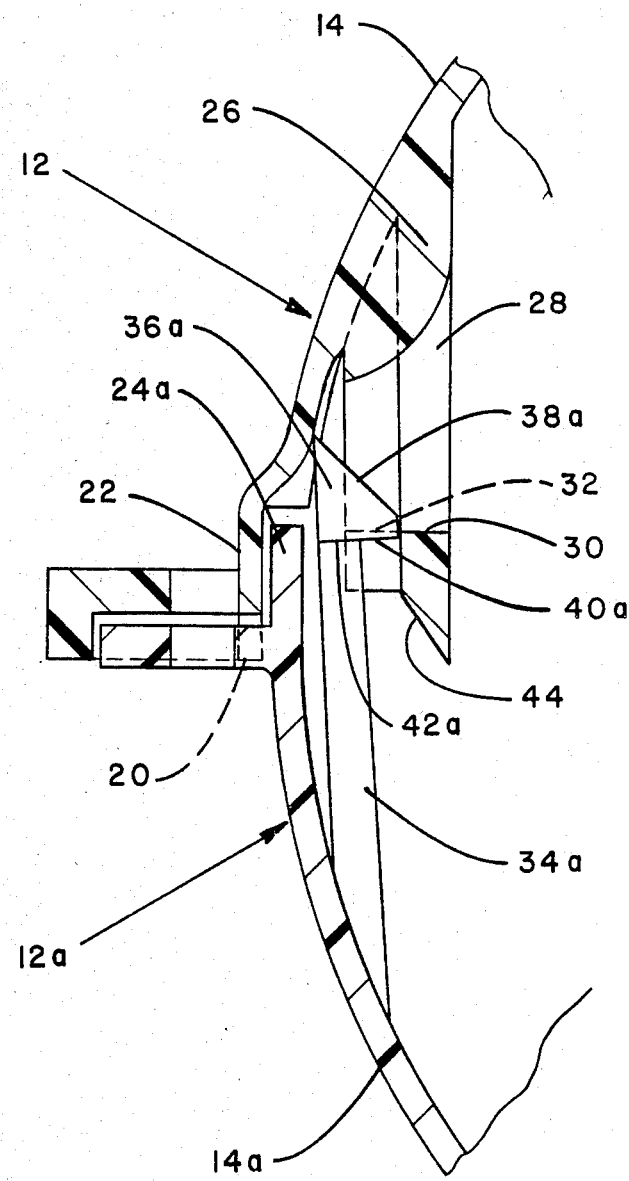
FIG. 8 is a view in section taken on line 8—8 of FIG. 7.

Also, as illustrated in FIG. 8, during such assembly the legs 34, in addition to flexing together, must also flex outwardly (toward the wall 14) to allow latching surfaces 40 to snap over the latching edge 30. In the preferred embodiment of the invention the legs are so positioned and dimensioned that just before the surface 40 snaps over the latching edge 30, the extreme end of the leg contacts the inner surface of the wall 14, so that to complete the assembly, there must be resilient flexing of either the wall or the end of the leg, or both. This structure is disclosed and claimed in a copending application Ser. No. 523,099 filed Aug. 15,1983 and assigned to the same assignee as the present invention.

To thereafter open the seal without leaving evidence of tampering it is necessary to disengage both legs 24 (or legs 24a) simultaneously. To disengage the leg 24a, for example, it is necessary to effect disengagement from both latching surfaces 30 and 32, which cannot be accomplished by merely pushing the legs radially outwardly to cause disengagement from the latch surfaces 30 (or 30a), but the legs must simultaneously be flexed together to also cause disengagement from the latching surfaces 32.

The disengagement of the legs is made more difficult, if not impossible, by the fact that on outward flexing of the legs for disengagement, the ends of the legs contact the wall before the latching surfaces 40 disengage from the latching edge 30, and on flexing of the legs together for disengagement from the latching edges 32, the end of the legs abut against each other before the latching surfaces 42 disengage from the latching edges 32.

Therefore release of the fastener in this manner will require resilient flexing of some portion of the structure. Although the flexing required for assembly is readily accomplished by the camming actions of the components as previously described, it is substantially impossible to impart the necessary force to the legs to cause the flexing necessary for release without fracture of some portion of the assembly.

As in previously known devices of this type, it is important that the fasteners, when engaged, provide a breaking strength which is greater than the strength of the outer housing, so that on attempts to tamper with the seal, a portion of the housing will break before the fasteners.

It is also important that after engagement, the two halves of the seal are not tightly engaged, but are sufficiently loose that the looseness can be readily determined by moving the housing portions in relation to each other, or by tapping the side of the assembled seal, so that a rattle-like sound is produced.

This rattle-like sound demonstrated that the seal has not been broken open and then glued back together, since in such case, the rattle-like sound would not be produced.

This effect obtained by having the length of the legs such that after engagement, when the two halves are held together, the latching surfaces on the legs are spaced slightly away from the latching surfaces on the tongue, and by having the distance between the outermost sides of the legs 34 at the latch surface 42 slightly less than the width of the aperture 28 between the side edges 32 thereof.

Although in the illustrated embodiment, the interferences between the legs on assembly occurs at the extreme end, if desired protrusions could be provided on the adjacent surfaces of the legs spaced rearwardly from the ends thereof for this purpose.

It will also be apparent that if desired, both sets of legs could be provided on one portion of the housing, with tongues having apertures to receive the legs being provided at both ends of the other housing portion.

Since certain other changes apparent to one skilled in the art may be made in the herein described embodiments of the invention without departing from the scope thereof, it is intended that all matter contained herein be interpreted in an illustrative and not a limiting sense.

We claim:

1. A seal housing portion for assembly with an identical housing portion to enclose a device to be protected, said housing portion comprising a body shaped to enclose said device when assembled with an identical housing portion, said housing portion having fasteners positioned at spaced locations thereon shaped and positioned for locking engagement with the fastener portions of an identical housing portion, one of said fastener portions comprising a member having an aperture, the other fastener portion comprising at least two resilient legs having locking shoulders positioned and dimensioned for locking engagement in the aperture of an identical housing portion for locking engagement with the edges of said aperture, said aperture having a side edge and an end edge at each end of the side edge and said legs are dimensioned and positioned so that at least one of said legs has locking shoulders latched into simultaneous engagement with both the side edge and an end edge.

2. A seal housing as set out in claim 1 in which said member has a cam surface adjacent each end of the aperture, said cam surface being positioned to cause a portion of the legs to flex together into abutting relation prior to the engagement of the locking shoulders in the aperture.

3. A seal comprising a housing formed of two portions and means for retaining said portions in locking engagement to enclose an article to be protected, said means comprising a member on one of said portions having an aperture forming end edges and at least one connecting edge, a pair of forwardly extending resilient legs on the other of said portions, each of said legs having rearwardly facing shoulders on the end thereof, said legs and said shoulders being dimensioned and positioned for snapping engagement into said aperture of the other portion so that the shoulder on each leg engages behind both an end edge and a connecting edge simultaneously.

4. A seal as set out in claim 3 in which the housing portions are identical and each housing has a said member with an aperture and a said pair of forwardly extending legs positioned and dimensioned to engage the legs and aperture, respectively, of the other housing portion.

5. A seal comprising a housing formed of two identical portions having means for assembly into locking engagement, said means comprising on each portion a tongue having an aperture and a pair of legs spaced from the tongue, said legs and said tongue being positioned for locking engagement with the tongue and legs, respectively, of an identical housing portion, said aperture having opposite end portions forming latching surfaces and a connecting edge forming a latching surface, said legs having latching shoulders formed on the ends thereof to simultaneously engage both the latching surface on an opposite end portion of the aperture and the latching surface formed by the connecting edge.

6. A seal as set out in claim 5 in which said aperture has camming surfaces associated with said opposite end portions to cause a portion of the legs, on insertion thereof, to flex together into abutting angagement prior to the engagement of the latching shoulders of the legs with the latching surfaces of the aperture.

7. A seal portion for assembly with an identical seal portion for enclosing a gas meter connection nut or the like, said portion comprising a semi-circular wall with inwardly extending flanges at the top and bottom of said wall and a fastener at each end of the semi-circular wall for locking engagement with a fastener of an identical seal portion, said fasteners comprising a tongue at one end of the seal portion and a pair of legs at the other end of the seal portion, said tongue being secured to the interior of the seal portion at one end of the seal portion in spaced relation to the adjacent wall and having means for receiving the legs of an identical seal portion in locking engagement, said means comprising a pair of vertically spaced cam surfaces disposed on the side of the tongue nearest the wall, said cam surfaces leading to latching surfaces disposed behind the cam surfaces, said legs having latching shoulders for locking behind said latching surfaces and being positioned and dimensioned so as to be flexed together into abutting relationship by said cam surfaces during assembly prior to reaching the position at which the latching shoulders lock behind said latching surfaces, in which an inclined ramp is provided between said camming surfaces which leads to a third latching surface disposed between said first mentioned latching surfaces and is co-planer therewith, and each of said legs has latching shoulders that engage one of said first mentioned latching surfaces and said third latching surface simultaneously.

8. A seal as set out in claim 7 in which an inclined ramp is provided between said camming surfaces which leads to a third latching surface disposed beween said first mentioned latching surfaces and is co-planer therewith, and each of said legs has latching shoulders that engage one of said first mentioned latching surfaces and said third latching surface.

9. A seal as set out in claim 7 in which the components are positioned and dimensioned so that on assembly with an identical seal portion, the ends of the legs engage the adjacent semi-circular wall and are cammed toward the camming surface of the inclined ramp prior to the position at which the latching shoulders of the legs engage the latching surfaces.

* * * * *